Aug. 15, 1961   G. A. BAALSON   2,995,972
POLARIS CIRCLE GRID
Filed May 16, 1957

INVENTOR.

George A. Baalson

United States Patent Office  2,995,972
Patented Aug. 15, 1961

2,995,972
POLARIS CIRCLE GRID
George A. Baalson, Indus, Minn.
(Tower, Minn.)
Filed May 16, 1957, Ser. No. 659,604
2 Claims. (Cl. 88—2.3)

This invention relates to navigation equipment and more particularly to a Polaris circle grid and star fix locater.

It is an object of the present invention to provide a grid or reticle for use in star fix locaters that includes optical and mechanical movements so constructed and arranged as to enable the observer to locate his position or fix relative to latitude and longitude.

It is another object of the present invention to provide a grid or reticle of the the above type for use in a locater especially in regions neighboring the North Pole in which the locater includes two telescope objectives and other optical elements mounted and arranged for orientation by micrometer worm gear combinations for positioning the image of a reference star upon the center of the grid.

Other objects of the invention are to provide a star fix locater bearing the above objects in mind which is of simple construction, has a minimum number of parts, is inexpensive to manufacture and efficient in operation.

Figure 1:
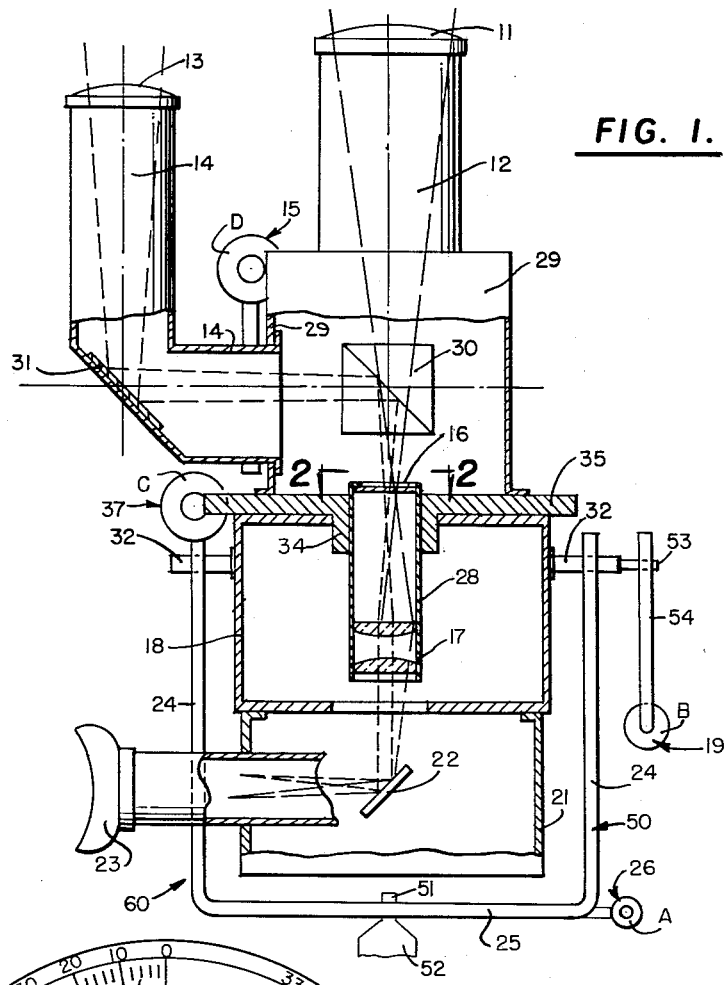
Figure 2:
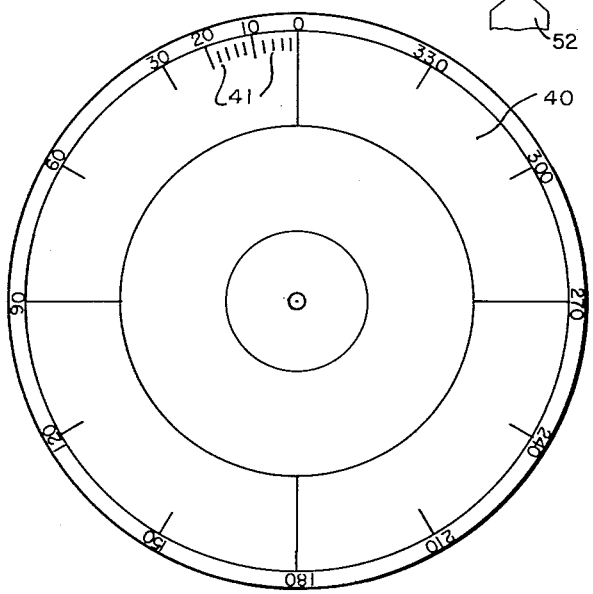

For other objects and for a better understanding of the invention, reference may be had to the following detailed description taken in conjunction with the accompanying drawing, in which:

FIGURE 1 is a diagrammatic view of a star fix locator made in accordance with the present invention, in operative use; and FIGURE 2 is a top plan view of a grid or reticle forming a part of the present invention.

Referring now more in detail to the drawing, a Polaris circle grid and star fix locater made in accordance with the present invention is shown in an assembled relationship.

As is more clearly shown in FIGURE 1, the star fix locater includes a polar objective lens 11 that is carried by the polar telescope 12. A star object lens 13 and a star telescope 14 rotatably mounted relatively to the polar star telescope 12 by means of manually adjustable declination gear and micrometer drive assembly 15 which includes a dial D. The assembly 15 is conventional and rotates the telescope 14 relative to the telescope 12 so that it has swinging movement relative to telescope 12, with the degree of movement shown on the dial D. A Polaris circle grid reticle 16 is mounted at the principal focus of the telescope lens with the center of the concentric circles of the reticle 16 concentric to the axis of the rotation of the telescope 12. Another micrometer drive assembly 19, having a dial B, is provided for selectively rotating the telescopes 12 and 14 upon a horizontal axis. An eyepiece assembly designated generally by the reference numeral 60, is cooperatively arranged with the respect to the retical 16 and is carried on the low end of the housing 18. Assembly 17 is supported below the telescope 12.

The housing 18 includes a tube 28 which has the reticle 16 at the upper end thereof and the lens assembly 17 adjacent its lower end. The housing 18 is supported upon a pair of shafts 32 rockably supported on the upper ends of legs 24 of a U-shaped support structure 50. The shafts 32 form a horizontal axis. The structure 50 has its bight 25 connected by a pin 51 to a base member 52. An extension 53 on one of the shafts 32 is attached to the upper end of an upright arm 54 operatively connected to a micrometer drive assembly 19 having a dial B.

An eyepiece ball housing 21 adjustably supports an eyepiece 23 for movement relative to a mirror or prism 22 which is in position below and in alignment with the retical 16 and erecting lens 17 supported below the telescope 12.

Another micrometer drive assembly 26, having a dial A, is carried by the base member 52 and drivingly engages the perimeter of the bight 25 of the structure 50 for effecting rotation of the structure 50.

Rotatably mounted on the upper end of the housing 18, is a disc 35 carrying on its upper face a circle graduated in increments of degrees so that any degree of rotation of the disc 35 relative to the housing 18 may be determined.

On the disc 35 for rotation therewith is a box 29 carrying the telescopes 12 and 14 and supporting a prism or beam splitter 30 cooperating with a mirror 31 in the lower end of the telescope 14. Another micrometer drive assembly 37, including a dial C, is operatively connected to the perimeter of the disc 35 for affecting the rotation of the latter.

Referring now to FIGURE 2 of the drawing, the pattern of the grid and reticle consists of various lines and circles. On the Polaris grid 40 is found the Polaris circle (second from outside) 42, computed, dimensioned, and positioned as hereinafter described; said circle 42 is graduated in units of degrees 41 so that any angular position may be obtained. Other lines and circles are simply for guidance in focusing and positioning images. The Polaris circle 40 is graduated in units of degrees 41 so that any angular position may be obtained.

In use, the grid is mounted at the principal focus of the polar telescope lens with the center of the concentric circles on the axis of rotation, which axis must coincide with the principal axis and the center of the lens. By moving the polar scope and reference star scope into proper position by actuating the micrometer worm gear assemblies, the image of the reference star appears at the center of the grid and the image of the Polaris appears on the grid at a point corresponding to the siderial hour angle of the star, which readings can be taken to indicate the position or fix of the observer. When the various elements are in proper position as stated, the following readings can be taken from the micrometer worm gear combination that are calibrated in degrees and minutes of angle: Dial A, compass bearing; dial B, latitude; dial C, local hour angle; dial D is a presetting that is used to set the device before use.

Since the radius of the path of the image of Polaris on the grid is determined by the angular distance between Polaris and the celestial North Pole, and on the focal length of the polar lens, this radius will vary with the apparent movement of the Polaris from year to year. Astronomical data will thus be required to determine that radius and the position of the grid circle with respect to related parts of the instruments. To illustrate how the Polaris circle is computed with GHA of Aries and the declination of Polaris is 59 degrees and four minutes N, then the radius of the Polaris circle on the grid will correspond to an arc of 56 minutes. To compute this radius, assume that the focal length of lens 11 to be 140 millimeters. Then: $r=140$ tangent 56 minutes or $140\times.0613$ or 2.282 millimeters. If the SHA of Polaris is 332, it is then 28 degrees angular distance from first point of Aries. The grid will then have to be revolved about the principal axis of the scope so that its zero will be 28 degrees counter clockwise (looking from top) from a vertical line through center of circle when instrument is set at lattitude zero, LHA 360 (0).

The accuracy of the setting can be checked by the following method: With instrument set, as above: sight on some distant object, such as top point of a building;

focus image of said point in center of grid, then actuate micrometer altitude assembly 19B so as to raise scope 12. Image should now pass through circle at 152 degrees, apparently on bottom of circle as seen through eye piece. Now, reverse the process, lowering scope 12; the image should again pass through zero and continue across circle until it cuts the top side at 332 degrees.

The procedure described above also serves as a check on accuracy of diameter or radius of Polaris circle; the difference in readings on micrometer dial between top and bottom settings should be 112 minutes of angle, representing the diameter, and 56 minutes representing the radius. It will be recognized, that while this device has been described in connection with manually operated adjustment mechanisms, this grid may be used in navigation and star fix locator devices that use photo electric cells or other similar automatic devices for the detection of star radiation instead of the visual detection as above. In such a device, the grid would be modified in such a way that the photo electric cell may be positioned so as to intercept and detect light, heat, and electric radiation from the reference star and Polaris in much the same manner as in the visually operated device. Of course, detection apparatus for radiation from Polaris will be at a point on the Polaris circle corresponding to S.H.A. of the reference star, and detection apparatus for the reference star radiation will be at the center of the circle. Furthermore, the image of the reference star can also be projected on a separate grid in which case the detection device will be at a point on the principal axis of the reference star objective. This particular type of system may or may not eliminate the use of the beam splitter used in the optical system. Of course, material from which the grid is constructed is not necessarily limited to glass or transparent material.

As an example of the manner in which the instrument is used, the following steps are taken where, for example, the instrument is set up at Indus, Minnesota, where, according to accurate survey maps, the coordinates are: west longitude 93°52′, latitude 48°38′ north, time of reading: February 17, 1957, 8 p.m. central standard time, reference star: Procyon, Dec. 5°20′ N. SHA 245°43′:

(1) The instrument is first leveled upon its supporting base.

(2) The declination dial D–15 is set to read N. 5° 20′.

(3) The dial B–19 is set to approximate latitude, in this case 48°.

(4) The dial A–26 is actuated to move the scope 12 in the general direction of Polaris until the image of Polaris can be seen when looking through the eyepiece 23.

(5) The disc 35 is turned by the micrometer assembly 37 until Procyon appears on the retical 16.

(6) Since SHA of Procyon is 245°43′, the dials A–26 and B–19 are turned until the image of Polaris appears at 246 on Polaris circle grid, setting at nearest degree is accurate enough as arc of 1° on circle is about .0015′.

(7) The disc 35 is turned until the image of Procyon appears in exact center of the Polaris circle, whereupon the instrument is now in proper position for taking a reading. The time must be taken very accurately as the image stays in the small circle for only about two seconds.

(8) The time now must be carefully checked, in the present example, it was 8:00 o'clock central standard time or 2:00 o'clock Greenwich mean time.

(9) Find GHA of Procyon by adding 245–43 to GHA Aries, 177–32 (air almanac) which equals 422–75.

(10) The dial Z–37 is read for LHA and is found to be 329°23′.

(11) The LHA is subtracted from GHA Procyon; that is, 422–75 minus 329–23 equals 93°52′ west longitude.

(12) The altitude is then read on the dial B–19, which was 48°38′, thus completing the reading of the instrument.

Further in use if the instrument is set with the latitude reading at zero, and LHA reading at 360 degrees with instrument in this position focus image of some distant point on the Polaris circle at the 50 degree mark; at this point the latitude micrometer reads 2.5 minutes. Then turn dial 19 (latitude) raising scope 12 until the image of the distant object stops at 70 degrees on the circle; now the latitude dial reads 21.5 minutes. It will be seen that a change of 20 degrees on the Polaris circle effected a change of 19 minutes of arc on the latitude reading. Hence setting the image of Polaris at the nearest SHA degree of index star would produce an error of about half a minute at the most, as far as lattitude reading is concerned. (Actually, the motion in this demonstration was a straight line, so we measured the chord; however, if my tables are correct the ratio of arc to chord in a 20 degree segment is 349:347.)

The above demonstration involved movement about the horizontal axis, which measures altitude or latitude. To see how a change of position of the Polaris circle will affect the LHA or longitude reading, we can do the following: Set the instrument to read latitude 90 degrees, that is with scope 12 in a vertical position. Then set index star scope 14 at zero declination. Using LHA micrometer dial assembly C33, focus a distant object again on 50 degrees, take reading on dial, and move until image of object stops on 70. Difference on Polaris circle was 20 degrees, on LHA dial was 16 minutes. (Difference from latitude readings was due to difference in focal length of lenses 13 and 11.

While various changes may be made in the detail construction, it shall be understood that such changes shall be within the spirit and scope of the present invention as defined by the appended claims.

What I claim as new and desire to protect by Letters Patent of the United States is:

1. A star fix locater comprising in combination, in a housing mounted for rotation about polar, vertical and horizontal axes and having in optical alignment a polar telescope objective, a beam combining prism, a Polaris circle grid and reticle, an eyepiece assembly including erector lenses for viewing the image of the polar star on said Polaris circle and grid reticle, a reference star telescope objective mounted on said housing for rotation about an axis perpendicular to and intersecting the axis of said polar star telescope objective, a manual adjusting means carried by said housing and connected to said star telescope objective mounting for presetting the declination of the star objective sighting axis with respect to the equatorial plane, a mirror in optical alignment with said reference star telescope objective and said beam combining prism, said prism being adapted to deflect the image forming rays from the reference star telescope objective into the path of image forming rays from said polar star objective to thereby form images of a reference star and the polar star on the grid reticle and Polaris circle, said grid reticle and Polaris circle being at the common focal plane of said Polaris star telescope objective, said reference star telescope objective, and said eyepiece assembly, and hand actuable calibrated means for rotating said housing about said polar, vertical and horizonal axes so that when image forming rays from the polar star and from a reference star form images at proper points on said Polaris circle and grid reticle, the calibrations on said means will indicate the latitude of the observer and the compass bearing of the locater.

2. A star fix locater comprising in combination, in a housing mounted for rotation about vertical and horizontal axes and having in optical alignment a polar star telescope objective, a beam combining prism, a Polaris circle and grid reticle, an eyepiece assembly including erector lenses for viewing the image of the polar and reference stars on said Polaris circle and grid reticle, a reference star telescope objective mounted on said housing for rotation about an axis perpendicular to and intersecting the axis of said polar star telescope objective, a manual adjusting means carried by said housing and connected to said star telescope objective mounting for presetting the declination of the star objective sighting axis with respect to the equatorial plane, a mirror in optical alignment with said reference star telescope objective and said beam combining prism, said prism being adapted to deflect the image forming rays from the reference star objective into the path of image forming rays from said polar star objective to thereby form images of a reference star and the polar star on the grid reticle and Polaris circle, said grid reticle and Polaris circle being at the common focal plane of said Polaris star telescope objective, said reference star telescope objective, and said eyepiece assembly, and hand actuable calibrated means for rotating said housing about said polar, vertical and horizontal axes so that when image forming rays from the polar star and from a reference star form images at proper points on said Polaris circle and grid reticle, the calibrations of said means when used with known astronomical and navigational data will indicate the terrestrial position of said locater.

References Cited in the file of this patent

UNITED STATES PATENTS

| | | |
|---|---|---|
| 2,566,312 | Cable | Sept. 4, 1951 |
| 2,688,896 | Tripp | Sept. 14, 1954 |
| 2,715,277 | Lang | Aug. 16, 1955 |

FOREIGN PATENTS

| | | |
|---|---|---|
| 105,371 | Great Britain | Apr. 5, 1917 |
| 840,326 | France | Jan. 16, 1939 |
| 610,561 | Great Britain | Oct. 18, 1948 |